United States Patent Office 3,174,713
Patented Mar. 23, 1965

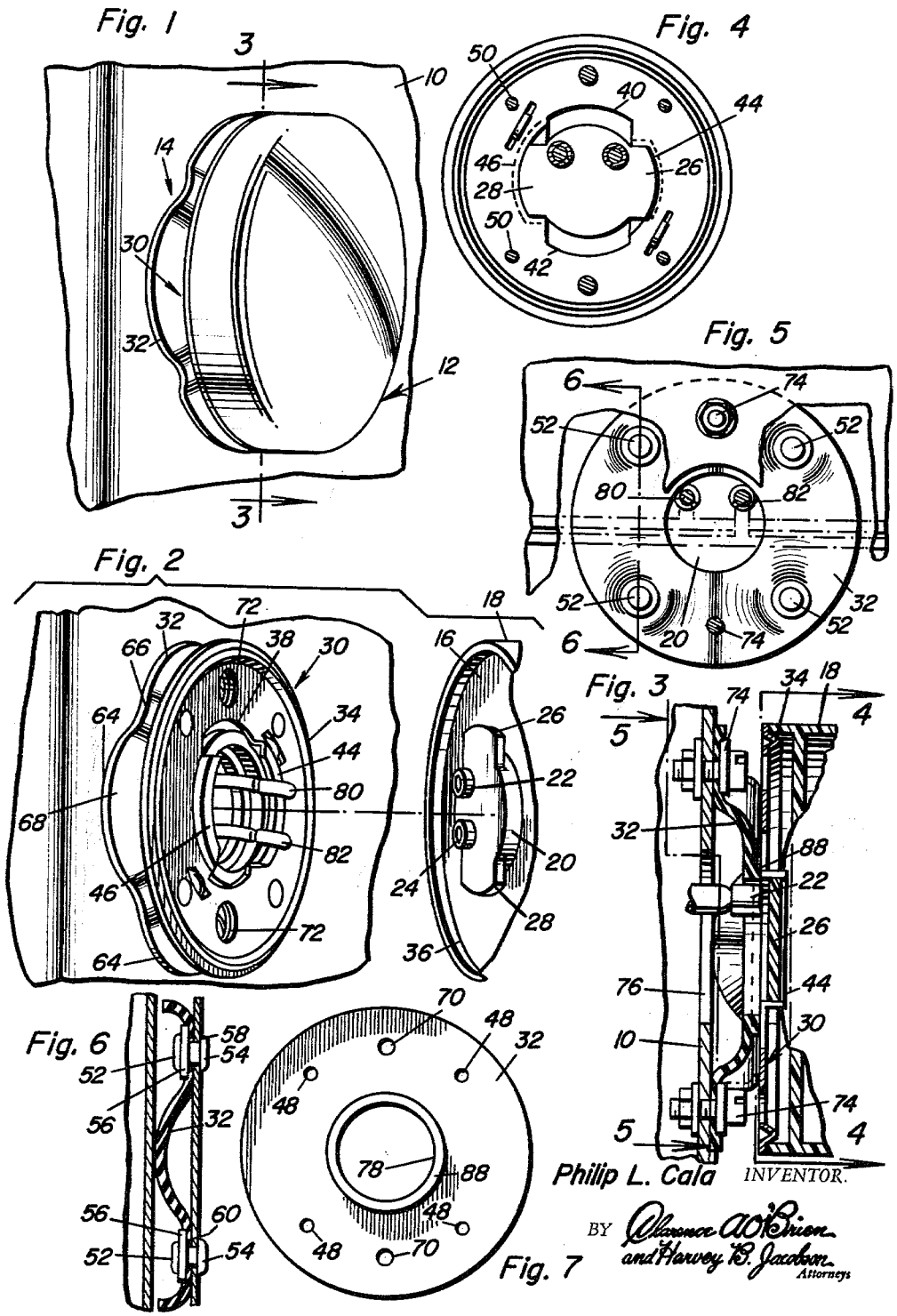

3,174,713
VEHICLE LIGHT RESILIENT MOUNT
Philip L. Cala, Jamestown, N.Y., assignor to Truck-Lite Company, Inc., Jamestown, N.Y., a corporation of New York
Filed Aug. 1, 1962, Ser. No. 214,075
6 Claims. (Cl. 248—204)

This invention relates to a novel and useful resilient mount for a vehicle light and more specifically to a resilient mount primarily designed for the purpose of providing a simple and inexpensive means of resiliently mounting a vehicle light.

A further object of this invention is to provide a resilient mount for a vehicle light which is particularly well adapted to resiliently support a unitary vehicle light and lens assembly.

Yet another object of this invention is to provide a resilient mount for a unitary light and lens assembly that will enable the light and lens assembly to be readily removed from engagement with the mount in order that the light and lens assembly may be readily renewed.

A final object of this invention to be specifically enumerated herein is to provide a resilient mount for a vehicle light in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a portion of a vehicle shown with the resilient mount of the instant invention being utilized to resiliently mount a unitary light and lens assembly from the vehicle;

FIGURE 2 is a fragmentary perspective view similar to that of FIGURE 1 but shown with the unitary light and lens assembly removed from engagement with the resilient mount;

FIGURE 3 is an enlarged sectional view taken substantially upon the plane indicated by the section line 3—3 of FIGURE 1;

FIGURE 4 is a sectional view taken substantially upon the plane designated by the section line 4—4 of FIGURE 3 and on somewhat of a reduced scale;

FIGURE 5 is a sectional view taken substantially upon the plane indicated by the section line 5—5 of FIGURE 3 and on somewhat of a reduced scale;

FIGURE 6 is a fragmentary sectional view taken substantially upon the plane indicated by the section line 6—6 of FIGURE 5; and FIGURE 7 is a plan view of the resilient washer which comprises the resilient portion of the mount comprising the instant invention.

Referring now more specifically to the drawings there will be seen a vehicle panel 10 on which a unitary light and lens assembly generally referred to by the reference numeral 12 is mounted by means of the resilient mount of the instant invention which is referred to in general by the reference numeral 14.

The light and lens assembly includes an annular base 16 over which a dished lens 18 is secured. The base 16 includes a cylindrical projection 20 through which terminals 22 and 24 are secured. It is to be understood that the terminals 22 and 24 are connected to a suitable electric light (not shown) housed within the lens 18. The cylindrical projection 20 includes a pair of planar ears 26 and 28.

The resilient mount 14 comprises an annular base generally referred to by the reference numeral 30 and a resilient washer 32. The base 30 may be stamped from any suitable thickness of sheet metal and includes a circumferential ridge 34 which is adapted to be snugly received within the recess 36 defined by the base 16 and lens 18 and into which the cylindrical projection 20 extends. In this manner, when the lens 18 is secured to the base 30 a weathertight seal will be formed between the confronting surfaces of the base 30 and lens 18.

The base 30 is apertured as at 38 and includes diametrically opposite cutout portions 40 and 42 for receiving the ears 26 and 28 respectively. The base 30 also includes arcuate recesses 44 and 46 for the reception of the ears 26 and 28 respectively after the ears 26 and 28 have been passed through the cutout portions 40 and 42 and the lens 18 has been rotated about the longitudinal axis defined by the cylindrical portion 20 approximately 90°. The engagement of the ears 26 and 28 with the arcuate recesses 44 and 46 defines a bayonet type of connection between the light and lens assembly 12 and the resilient mount 14.

The washer 32 of the resilient mount includes four apertures 48 which are spaced circumferentially thereabout and the annular base 30 includes a corresponding set of four apertures 50 with which the apertures 48 are registrable.

Four fasteners 52 in the form of rivets are secured through the registered apertures 48 and 50 and each includes a pair of diametrically enlarged abutment members 54 and 56 which include opposing surfaces 58 and 60 that overlie the adjacent surfaces of the washer 32 and are disposed closer to one another than the combined normal thicknesses of the base plate 30 and washer 32. As the base plate 30 is constructed of relatively non-compressible material, the washer 32 is compressed and reduced in thickness in the areas disposed between the abutment surfaces 58 and 60. In this manner, portions of the washer 32 which would normally be disposed in the areas between the abutment surfaces 58 and 60 are displaced outwardly of these areas and a plurality of dimples or waves 64 defining crests 66 and troughs 68 extending radially of the washer 32.

The washer 32 has a pair of diametrically opposite apertures 70 formed therein which are disposed in a pair of diametrically opposite ones of the troughs 68 and the base plate 30 is provided with a pair of larger diameter apertures 72 which are registrable with the apertures 70. A pair of headed fasteners 74 are utilized to secure the washer 32 to the panel 10 about the opening 76 formed in the latter which is registered with the opening 78 formed in the washer 32. The wires 80 and 82 which are to be connected to the terminals 22 and 24 respectively project through the openings 76 and 78 and are secured to the terminals 22 and 24 prior to the light and lens assembly 12 being secured to the resilient mount 14.

The washer 32 includes an annular shoulder 88 which is disposed about the opening 78 and projects laterally away from the side of the washer 32 opposing the base plate 30. The shoulder 88 is receivable in the recesses 44 and 46 and is slightly smaller in diameter than the circle defined by the cutout portions 40 and 42. In this manner, the shoulder 88 may abut against the outer end of the cylindrical portion 20 and form a weathertight seal therewith when the light and lens assembly 12 is secured to the resilient mount 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A resilient mount for a vehicle light including an annular base plate adapted to be mounted upon a supporting surface with said base plate generally paralleling and slightly spaced from said supporting surface, said mount comprising a washer constructed of resilient, flexible and elastomer material and having circumferentially spaced waves formed therein extending generally radially of said washer, each of said waves, as seen from the edge of said washer, defining a crest with each pair of adjacent crests defining a trough therebetween, one side of said washer being disposed in opposing relation to the side of said plate adapted to oppose said surface, means securing at least two of the corresponding crests of said one side of said washer to corresponding portions of said plate, and two of the corresponding troughs of said washer including means adapting said washer for securement to said supporting surface, said means securing said two crests of said washer to said plate including means compressively engaging said washer and deforming the latter to form said waves.

2. The combination of claim 1 wherein said washer includes two pairs of diametrically opposite waves.

3. The method of increasing the shock absorbing qualities of a flexible and resilient panel-like member comprising the following steps; compressing said panel-like member from opposite sides and at a plurality of spaced points thereon, causing said panel-like member to be reduced in thickness over appreciable plane area at each of said points, and displacing portions of said panel-like member normally disposed in said compressed areas outwardly of said areas so as to form waves in said panel-like member projecting laterally of the medial plane of said panel-like member.

4. The method of claim 3 including the step of securing at least two of said compressed areas to a bracing member in fixed spaced relation.

5. A resilient mount for a vehicle light including an annular base plate adapted to be mounted upon a supporting surface with said base plate generally paralleling and slightly spaced from said supporting surface, said mount comprising a washer constructed of resilient, flexible and elastomer material and having circumferentially spaced waves formed therein extending generally radially of said washer, each of said waves, as seen from the edge of said washer, defining a crest with each pair of adjacent crests defining a trough therebetween, one side of said washer being disposed in opposing relation to the side of said plate adapted to oppose said surface, means securing at least two of the corresponding crests of said one side of said washer to corresponding portions of said plate, and two of the corresponding troughs of said washer including means adapting said washer for securement to said supporting surface, said means securing said two crests of said washer to said plate including means compressively engaging said washer and deforming the latter to form said waves, each of said means compressively engaging said washer comprising a fastener secured through said washer and including abutment means on its opposite ends including diametrically enlarged opposing abutment surfaces overlying the adjacent surfaces of said washer and disposed closer to one another than the normal thickness of said washer.

6. A resilient mount for a vehicle light including an annular base plate adapted to be mounted upon a supporting surface with said base plate generally paralleling and slightly spaced from said supporting surface, said mounting comprising a washer constructed of resilient, flexible and elastomer material and having circumferentially spaced waves formed therein extending generally radially of said washer, each of said waves, as seen from the edge of said washer, defining a crest with each pair of adjacent crests defining a trough therebetween, one side of said washer being disposed in opposing relation to the side of said plate adapted to oppose said surface, means securing at least two of the corresponding crests of said one side of said washer to corresponding portions of said plate, and two of the corresponding troughs of said washer including means adapting said washer for securement to said supporting surface, the inner peripheral edge of said washer including an annular shoulder projecting toward said plate adapted to form a seal with a portion of an object secured to said plate and projecting slightly through said plate.

References Cited in the file of this patent

UNITED STATES PATENTS

| | | |
|---|---|---|
| 1,533,210 | Radu | Apr. 14, 1925 |
| 1,947,052 | Lack | Feb. 13, 1934 |
| 2,512,188 | Wait | June 20, 1950 |
| 2,917,264 | Hartenstein | Dec. 15, 1959 |